United States Patent
Tago et al.

(10) Patent No.: US 7,546,445 B2
(45) Date of Patent: Jun. 9, 2009

(54) INFORMATION PROCESSOR HAVING DELAYED BRANCH FUNCTION WITH STORING DELAY SLOT INFORMATION TOGETHER WITH BRANCH HISTORY INFORMATION

(75) Inventors: Shinichiro Tago, Kawasaki (JP); Tomohiro Yamana, Kawasaki (JP); Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 10/438,986

(22) Filed: May 16, 2003

(65) Prior Publication Data
US 2003/0226003 A1 Dec. 4, 2003

(30) Foreign Application Priority Data
Jun. 4, 2002 (JP) .............................. 2002-162445

(51) Int. Cl.
G06F 15/00 (2006.01)
G06F 7/38 (2006.01)
G06F 9/00 (2006.01)
G06F 9/44 (2006.01)

(52) U.S. Cl. .................................................... 712/238
(58) Field of Classification Search .................. 712/238
See application file for complete search history.

(56) References Cited

U.S. PATENT DOCUMENTS 5,367,703 A * 11/1994 Levitan ........................ 712/23
5,774,737 A * 6/1998 Nakano ........................ 712/24
5,815,696 A * 9/1998 Tanaka et al. ............... 712/233
5,949,996 A    9/1999 Atsushi
6,275,929 B1 * 8/2001 Blum et al. .................. 712/219
6,684,320 B2 * 1/2004 Mohamed et al. ............. 712/24
6,725,365 B1 * 4/2004 Cofler et al. ................ 712/233

OTHER PUBLICATIONS

Sharangpani H et al., "Itanium Processor Microarchitecture", IEEE Micro, IEEE Service Center, Los Alamitos, CA, US., vol. 20, No. 5, Sep. 2000, pp. 24-43, XP000976143; ISSN: 0272-1732 (18 pgs).
European Search Report for application No. 03253206.1-2211; dated Apr. 19, 2006 (3 pgs).

* cited by examiner

*Primary Examiner*—Eddie P Chan
*Assistant Examiner*—Brian P Johnson
(74) *Attorney, Agent, or Firm*—Staas & Halsey LLP

(57) ABSTRACT

In correspondence with an address of a branch instruction, a branch target address Apb, a valid bit V as branch history information, and delay slot information POS on the last position of delay slot instructions are stored in a branch target buffer 241. A branch prediction circuit 23 outputs hit information H/M as to whether or not an input address Ao is coincident with the branch instruction address, the valid bit which is also a branch prediction bit, the information POS, and the branch target address Apb. When a prediction error signal ERR is inactive, the address selection circuit 22 selectively outputs the output of an incrementer 21 and the branch target address Apb, based on the hit information H/M, the delay slot information POS, and the valid bit V.

22 Claims, 6 Drawing Sheets

FIG.3

| INDEX | TAG | BRANCH TARGET ADDRESS | V | POS | | |
|---|---|---|---|---|---|---|
| 0<br>1<br>2 | ⋮ | ⋮ | ⋮ | ⋮ | ⋮ | ⋮ |
| Ax | At | Apb | 1 | 0 | 1 | 0 |
| ⋮ | ⋮ | ⋮ | ⋮ | ⋮ | ⋮ | ⋮ |

241

○ PF = 1

INFORMATION PROCESSOR HAVING DELAYED BRANCH FUNCTION WITH STORING DELAY SLOT INFORMATION TOGETHER WITH BRANCH HISTORY INFORMATION

CROSS-REFERENCE TO RELATED APPLICATIONS

This application is based upon and claims the benefit of priority from the prior Japanese Patent Application No. 2002-162445, filed on Jun. 4, 2002, the entire contents of which are incorporated herein by reference.

BACKGROUND OF THE INVENTION

1. Field of the Invention

The present invention relates to various kinds of information processors having a delayed branch function, and more particularly to a variable-length VLIW (Very Long Instruction Word) information processor having a delayed branch function.

2. Description of the Related Art

As a processor's operating frequency increases, the number of pipeline stages increases, and thus the pipeline's disturbance resulting from branch instructions increases. In order to reduce a branch penalty, a branch prediction has been performed with a branch target buffer (BTB), and a delayed branch scheme has also been adopted in which a branch is executed after the execution of instructions (delay slot instructions) subsequent to a branch instruction. In a case where the number of steps SN of delay slot instructions is variable in length, information on the number of steps SN is included in a branch instruction code.

Meanwhile, in the VLIW processors, NOP (No Operation) instructions are added as dummy instructions in advance by a programmer or a compiler in order to logically attain spatially-parallel executable VLIWS. However, the program's versatility is low because the spatially-parallel executable VLIW depends on the characteristics of the VLIW processors, and the cache hit rate also decreases because a large number of NOP instructions are included in an instruction cache.

In order to overcome such problems, a variable-length VLIW processor as follows has been developed. A packing flag indicating a boundary between VLIWs is inserted in each instruction code of a VLIW so that VLIWs are variable in length. After the variable-length VLIWs (compressed VLIW) are read from the instruction cache by the processor, their boundaries are detected using the value of packing flags. NOP instructions are added to VLIWs whose instruction length is shorter than the maximum length, before they are provided to an instruction pipeline.

Even if a BTB output indicating a branch instruction is obtained by accessing the instruction cache and the BTB simultaneously using an instruction address, in the case of the variable-length VLIW, it is necessary to confirm up to which portion of a series of instructions, read from the instruction cache, belongs to one variable-length VLIW and then decode the VLIW so as to check which portion of the VLIW is the branch instruction, and further to read the information of the number of steps SN included in the branch instruction code.

According to the VLIW processor, since each of the VLIWs can be recognized as one block thanks to the packing flags, the number of steps SN can be variable in length without incorporating the information of the number of steps SN into the branch instruction code. In this case, there is no need to read the number of steps SN.

However, in order to confirm the number of steps of the delay slot instructions, it is necessary to confirm up to which portion of a series of instructions, read from the instruction cache, belongs to one variable-length VLIW and also to sequentially read instructions from the instruction cache up to an instruction code which includes a packing flag PF (for example, PF='1') designating the boundary of the delayed branch slot. If the reading of the delay slot instructions is performed without confirming the number of steps under the assumption that the number of steps is the maximum value, an unnecessary pre-reading is performed causing a delay in providing instructions to the instruction pipeline.

Therefore, irrespective of whether or not the information of the number of steps SN is included in the branch instruction code, a delay occurs in providing instructions from the instruction cache to the instruction pipeline. Because processors, other than the VLIW processor, also perform processes of reading instructions from the instruction cache and decoding the read instructions in a similar manner, such problems may occur in various kinds of processors having the delayed branch function.

SUMMARY OF THE INVENTION

Accordingly, it is an object of the present invention to provide an information processor having a delayed branch function wherein, irrespective of whether or not information of the number of steps of delay slot instructions is included in a branch instruction code, it is possible to achieve an early confirmation of the number of steps of delay slot instructions and also to reduce the branch penalty by avoiding an unnecessary pre-readings of instructions.

In one aspect of the present invention, there is provided an information processor having a delayed branch function, the processor comprising: an instruction cache; and an instruction read circuit for reading instruction codes from the instruction cache by addressing the instruction cache, wherein the instruction read circuit comprises:

a branch prediction circuit, including a storage in which a branch target address, branch history information, and delay slot information on a last position of delay slot instructions are stored in correspondence with an address of a branch instruction, outputting hit information as to whether or not an input address is coincident with the branch instruction address, when the coincidence is true, further outputting the delay slot information and prediction information on a presence of a branch based on the branch history information, and when the prediction information indicates that there is a branch, further outputting the branch target address;

an incrementer for outputting a sequential address; and an address selection circuit for selectively outputting the branch target address or an output of the incrementer, based on the hit information, the delay slot information, and the prediction information.

According to such a configuration, when a pre-reading of a branch target instruction is performed using the branch prediction circuit, the number of steps of the delay slot instructions can be read directly from the storage, without decoding the instruction codes and confirming the number of steps of the delay slot instruction. Therefore, without performing unnecessary pre-readings of instructions under the assumption that the number of steps is the maximum value, it is possible to prevent a delay in providing instructions to the instruction pipeline, thereby reducing the branch penalty.

BRIEF DESCRIPTION OF THE DRAWINGS

FIG. 3 is an illustration of a configuration of a table stored in a branch target buffer (BTB);

DESCRIPTION OF THE PREFERRED EMBODIMENT

Figure 1:
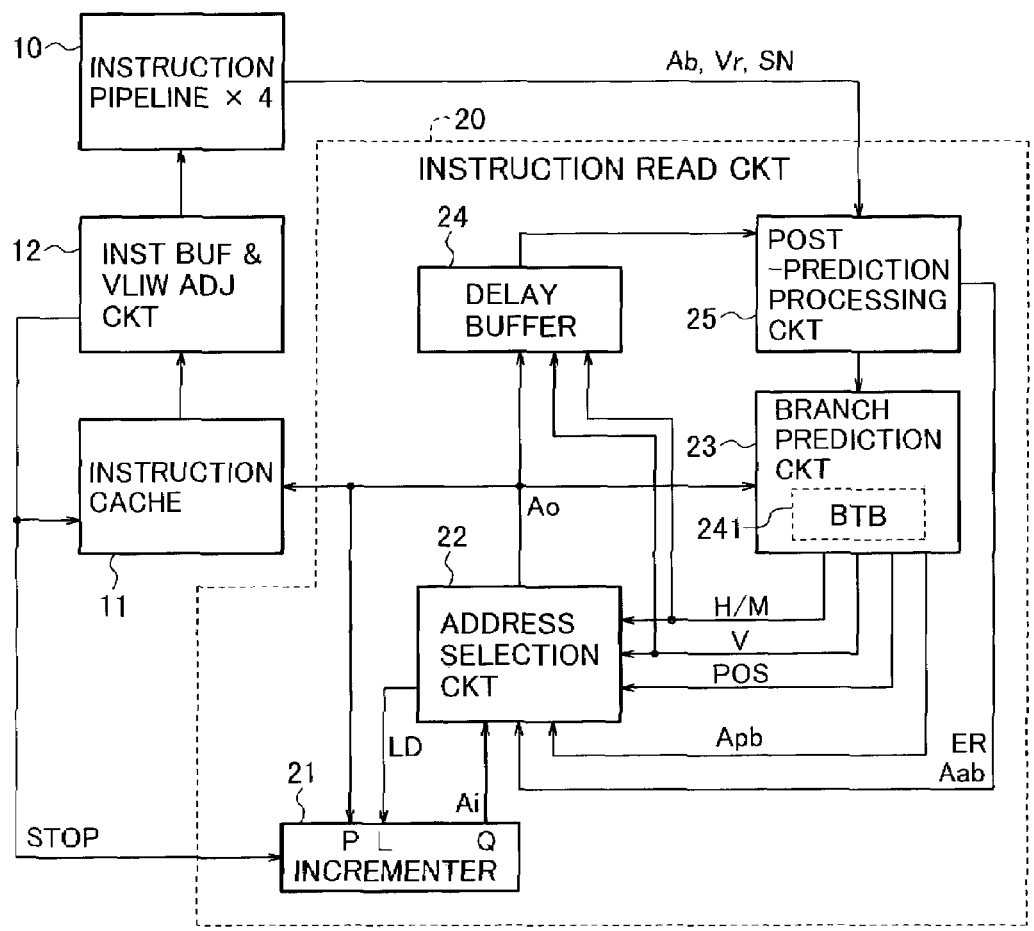
FIG. 1 is a schematic block diagram showing a part of a processor having a delayed branch function, according to a first embodiment of the present invention.

Referring now to the drawings, wherein like reference characters designate like or corresponding parts throughout several views, preferred embodiments of the present invention will be described below. A signal which is active low will be denoted with adding ★ to a reference character.

First Embodiment

FIG. 1 is a schematic block diagram showing a part of a processor having a delayed branch function, according to a first embodiment of the present invention.

The processor as an information processor is a VLIW processor. An instruction pipeline 10 includes, for example, four parallel processing units to be able to perform spatial-parallel executions while performing temporal-parallel executions in a pipeline of each processing unit. Each parallel processing unit of the instruction pipeline 10 has stages of an instruction fetch, an instruction decode, an instruction execution, a memory access, and a register write. In the following description, it is assumed that each of instruction codes included in a VLIW is fixed in length as four bytes and the number of parallel processing units of the instruction pipeline 10 is 4. Under this assumption, the instruction length of a VLIW in the instruction pipeline 10 is 4×4=16 bytes.

Figure 5:
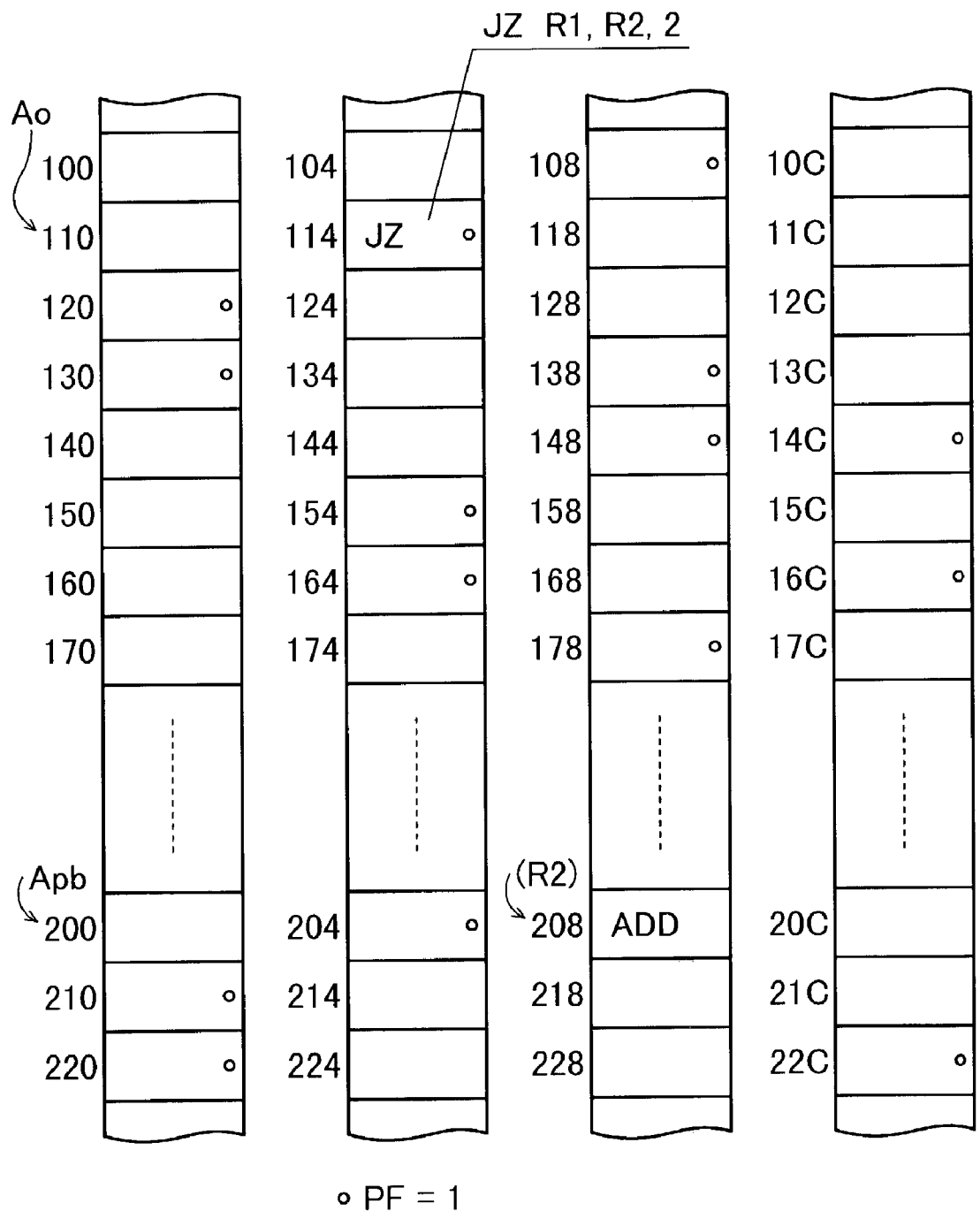
FIG. 5 is a schematic illustration of a part of a program stored in a main memory unit while dividing the program into four slots in correspondence with the four-parallel instruction pipeline 10 of FIG. 1.

FIG. 5 is a schematic illustration partly showing a program stored in a main memory unit (not shown) while dividing the program into four slots in correspondence with the four-parallel instruction pipeline 10.

The VLIW are variable in length in the program, where no NOP instruction for fixing the VLIW-length is added to the VLIW by a compiler. Each instruction code includes a packing flag PF. If PF='1', it means that the corresponding instruction code is the last instruction step of one variable-length VLIW. In FIG. 5, a symbol ○ indicates that PF='1'. For example, instruction codes, whose head addresses are &h10C, &h118, and &h124 (&h indicates a hexadecimal number), correspond to one variable-length VLIW.

Referring back to FIG. 1, in response to an input address Ao, the instruction cache 11 outputs 16-byte instructions whose head address is the address Ao.

An instruction buffer & VLIW adjustment circuit 12 maintains the output instructions, and recognizes the boundary between variable-length VLIWs by detecting an instruction code whose PF is '1'. In addition, the circuit 12 extends a VLIW shorter than 16 bytes into a fixed-length VLIW of 16 bytes by adding NOP instructions thereto before providing it to the instruction pipeline 10. For example, referring to FIG. 5, when 16 bytes of addresses &h200 to &h20F are read and then 16 bytes of addresses &h210 to &h21F are read, 12 bytes of addresses &h208 to &h213 are recognized as a variable-length VLIW and a four-byte NOP instruction is added thereto by the instruction buffer & VLIW adjustment circuit 12. The 12 bytes of addresses &h214 to h21F are used in the same way when the next 16 bytes are read.

An instruction read circuit 20 generates the read address for the instruction cache 11.

The branch instruction is a delayed branch instruction, and the number of steps SN of delay slot instructions is included in the branch instruction code in this embodiment. For example, referring to FIG. 5, a branch instruction code "JZ R1, R2, 2" indicates that, if the content of a register R1 is 0, a branch is executed to an address corresponding to the content (R2) of a register R2, and the number of steps SN is 2. In the case of FIG. 5, the delayed branch instruction is followed by VLIWs whose head addresses are &h118, &h124, and &h134 in sequence, and thus a VLIW of addresses &h118 to &h123 and a VLIW of addresses of &h124 to &h133 are the delay slot instructions. The delay slot instructions are executed irrespective of whether or not the branch is executed by the branch instruction. When the branch is executed, the procedure goes to the content (R2), for example the address &h208, of the register R2 after the delay slot instructions are executed. When no branch is executed, the procedure goes to the address &h134 subsequent to the delay slot instructions. Since the branch instruction and the delay slot instructions are executed temporally in parallel by the instruction pipeline 10, the branch penalty is reduced.

Because instructions are read from the instruction cache in 16-byte units, lower 4 bits of the address Ao are 0. Accordingly, when the procedure goes to, for example, the address &h208, its lower 4 bits are 0, and thus Ao becomes &h200.

Referring back to FIG. 1, the instruction read circuit 20 will be described below. All elements 21 to 25 of the instruction read circuit 20 operate in synchronism with a clock.

When an instruction address is composed of, for example, 32 bits, the content of an incrementer 21 is composed of 28 bits obtained by omitting the lower 4 bits of 0. The same is true in other addresses used by the instruction read circuit 20. The incrementer 21 is used for outputting sequential addresses, and when a load input L is low, the content of the incrementer 21 is increased by a predetermined value of 16 in response to the rising of the clock (the value in which the lower 4 bits are omitted increases by 1). When the load input L is high, the value on a parallel input P is loaded into the incrementer 21. The content of the incrementer 21 is output as an address Ai through an output Q.

An address selection circuit 22 selects one of addresses Ai, Apb and Aab provided from the incrementer 21, a branch prediction circuit 23, and a post-prediction processing circuit 25, respectively, and then outputs it as an address Ao to the instruction cache 11, the branch prediction circuit 23, and a delay buffer 24.

The branch prediction circuit 23 includes a branch target buffer BTB 241. The BTB 241 is a RAM in which a table as shown in FIG. 3 is stored. Each record of this table has the fields of a tag, a branch instruction's branch target address, a valid flag V as branch history information, and delay slot information POS regarding the number of steps of delay slot instructions.

When the valid flag V is '1' or '0', it indicates that a branch was performed or not performed, respectively, by a previous branch instruction. The BTB 241 is addressed by an index address Ax which is lower bits of the input address Ao. Of the record read by this addressing, the tag address At is compared with higher bits of the address Ao. When both addresses are identical (hit), a hit signal H/M becomes high, and when both, addresses are not identical (miss), the hit signal H/M becomes low.

The 'hit' indicates that the record has been registered in the BTB 241 and a delayed branch instruction is included in a next variable-length VLIW to be recognized by the instruction buffer & VLIW adjustment circuit 12 after being read from the instruction cache 11. The branch prediction circuit 23 outputs the hit signal H/M, the branch target address Apb, the valid flag V, and the delay slot information POS to provide them to the address selection circuit 22.

For example, referring to FIG. 5, when Ao=&h110, the branch instruction is included in the VLIW of addresses &h10C to &h117, and therefore if the corresponding record has been registered in the BTB 241, the hit signal H/M becomes high. In this case, the index address Ax and the tag address At are lower bits and higher bits, respectively, of Ao=&h110 and Apb=(R2)=&h208→&h200 and POS='010'. The correlation between the number of instruction steps SN and the delay slot information POS is that, when SN=1, 2, and 3, POS='001', '010', and '100', respectively. Namely, the number of instruction steps SN designates the position of a bit '1' in the delay slot information.

Figure 2:
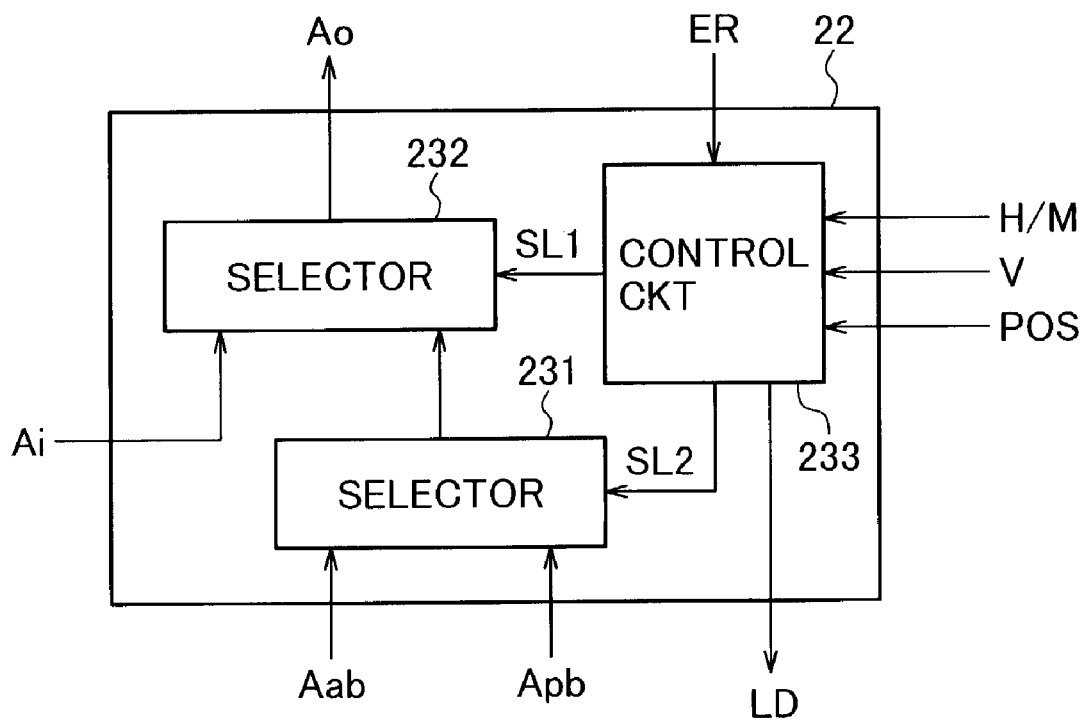
FIG. 2 is a diagram showing an embodiment of the address selection circuit 22 of FIG. 1.

FIG. 2 is a diagram showing an embodiment of the address selection circuit 22 of FIG. 1.

The address selection circuit 22 includes two selectors 231 and 232, and a control circuit 233 which provides control signals SL1 and SL2 to selection control inputs of the two selectors 231 and 232, respectively. The selector 231 selects and outputs one of addresses Aab and Apb. The selector 232 selects one of the address Ai and the output of the selector 231, and outputs the selected one as an address Ao. The control circuit 233 receives the hit signal H/M, the valid flag V, the delay slot information POS, and a prediction error signal ER. Based on these signals, the control circuit 233 generates the selection control signals SL1 and SL2, and the load signal LD.

Figure 4:
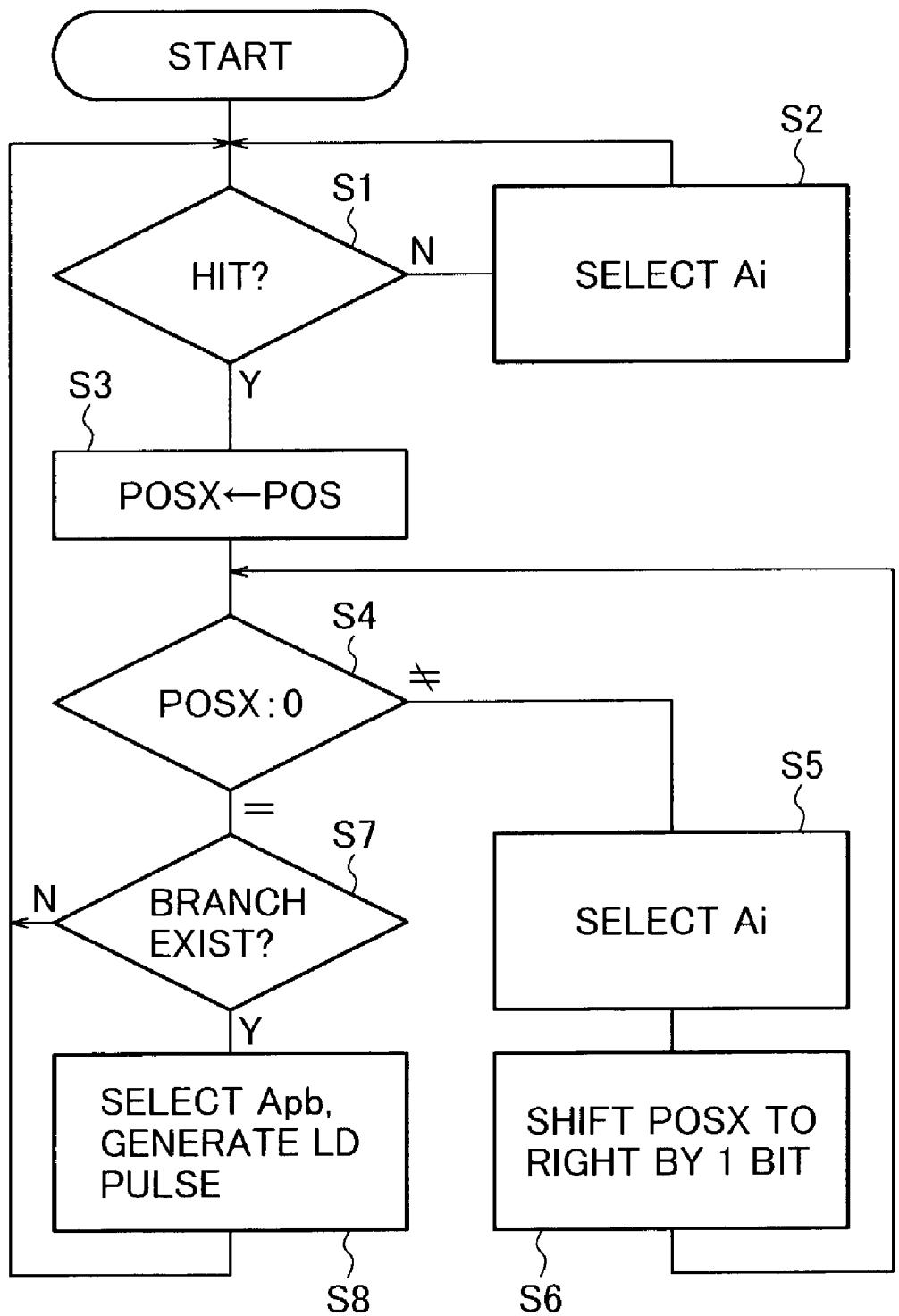
FIG. 4 is a flow chart showing the operation of the control circuit 233 of FIG. 2 when a prediction error signal ER is low.

FIG. 4 is a flow chart showing the operation of the control circuit 233 when the prediction error signal ER is low.

(S1) If the hit signal H/M is high, then the procedure goes to step S3, else goes to step S2.

(S2) The controller 233 causes the selector 232 to select the address Ai in synchronism with the clock, and the procedure returns to step S1. Thereby, it becomes that Ao=Ai.

It should be noted that for example, if instructions of addresses &h140 to &h14F in FIG. 5 have been previously read from the instruction cache 11, the next VLIW is of addresses &h14C to &h14F, and therefore a control signal STOP from the instruction buffer & VLIW adjustment circuit 12 causes the clock supply to the incrementer 21 to be stopped by one cycle and also causes the reading operation in the instruction cache 11 to be stopped.

(S3) The delay slot information POS is substituted for a POSX to holed the value. The POSX is a shift register in the control circuit 233.

(S4) If the shift register POSX is not equal to 0, then the procedure goes to step S5, else goes to step S7.

(S5) The control circuit 233 causes the selector 232 to select the address Ai, which is the address of the delay slot instruction, in synchronism with the clock. Thereby, it becomes that Ao=Ai.

However, when a VLIW to be read next time has been previously read, the stop operation is performed in the same manner as described above.

(S6) The shift register POSX shifts one bit to right, returning to step S4. For example, when POSX='010', this shift results in '001'.

Such a loop of steps S4 to S6 allows VLIW instruction addresses of the delay slot to be sequentially read.

(S7) If the valid flag V is high, then the procedure goes to step S8, else returns to step S1.

(S8) The control circuit 233 causes the selectors 231 and 232 to select the address Apb and the output of the selector 231, respectively, in synchronism with the clock. Thereby, it becomes that Ao=Apb. In addition, the control circuit 233 causes a pulse of the load signal LD to be provided to the load input L of the incrementer 21 to load the branch target address Apb to the incrementer 21.

For example, referring to FIG. 5, Ao=&h110 is provided to the branch prediction circuit 23, thereby the bit signal H/M becomes high, the procedure goes to steps S1, S3, S4, and S5, and Ai=&h120 is selected. The selected Ai is provided as an address Ao to the instruction cache 11, and the contents of the addresses &h120 to &h12F are read from the instruction cache 11. Subsequently, in step S6, the shift register POSX is shifted to right by one bit to be '001'. Through steps S4 and S5, Ai=&h130 is selected, which is provided as the address Ao to the instruction cache 11, and the contents of the addresses &h130 to &h13F are read from the instruction cache 11. Subsequently, in step S6, the shift register POSX is shifted to right by one bit to be '0001'. The procedure goes to steps S7 and S8 in which Apb=&h208→&h200 is selected, and Ao=&h200 is provided to the instruction cache 11, so that the contents of the addresses &h200 to &h20F are read out and &h200 is loaded into the incrementer 21. There is only one instruction code having PF='1' in the contents of the addresses &h200 to &h20F. However, when the procedure goes from step S1 to step S2 next time, the contents of addresses &h210 to &h21F are read from the instruction cache 11, and the VLIW of addresses &h208 to &h213 is recognized by the instruction buffer & VLIW adjustment circuit 12.

According to the first embodiment, when a pre-reading of a branch target instruction is performed using the branch prediction circuit 23, the information POS of the number of steps SN of delay slot instructions can be read directly from the BTB 241, without decoding the instruction codes and confirming the number of steps SN. Therefore, without performing unnecessary pre-readings of instructions under the assumption that the number of steps SN is the maximum value, it is possible to prevent a delay in providing instructions to the instruction pipeline 10, thereby reducing the branch penalty.

Referring back to FIG. 1, the address Ao, the hit signal H/M, and the valid flag V are maintained in the delay buffer 24 of FIFO. On the other hand, when the decode stage of the instruction pipeline 10 indicates a branch instruction, its branch target address Ab and the number of instruction steps SN are provided to the post-prediction processing circuit 25. In addition, a flag Vr indicating the result of the presence or absence of branch in the execution stage of the instruction pipeline 10, i.e., the result of a branch determination on whether or not the branch condition is satisfied, is provided to the post-prediction processing circuit 25. If Vr='1', it means that there is a branch, and if Vr=0, it means that there is no branch. The post-prediction processing circuit 25 reads the hit signal H/M, the valid flag V, and the address Ao corresponding to the branch instruction from the delay buffer 24. Here, the valid flag V is effective only when the hit signal H/M is high. In the following description, these SN, Ao, H/M, and V in the post-prediction processing circuit 25 are represented by [SN], [Ao], [H/M], and [V], respectively.

When the hit signal H/M is low, because the record regarding this branch instruction is not present in the branch target buffer 241, the post-prediction processing circuit 25 writes it into the branch target buffer 241. In this case, the value of the flag Vr is written as the value of the valid flag V of the branch target buffer 241. In parallel with this operation, the post-prediction circuit 25 sets the prediction error signal ER high, and provides the branch target address Ab as an address Aab to the selector 231.

When the hit signal [H/M] is high and [V]≠Vr, the post-prediction processing circuit 25 replaces the corresponding valid flag V in the branch target buffer 241 with the value of the flag Vr. In parallel with this operation, the post-prediction processing circuit 25 sets the prediction error signal ER high and provides the address Aab to the selector 231. At this time, If [V]='0', the post-prediction processing circuit 25 outputs the branch target address Ab as Aab, and if [V]='1', this circuit 25 obtains an address subsequent to the delay slot based on [Ao] and [SN], and outputs the obtained address as Aab.

Referring to FIG. 2, when the prediction error signal ER is high, the control circuit 233 causes the selectors 231 and 232 to select the address Aab and the output of the selector 231, respectively, and, in addition, loads the address Ao=Aab into the incrementer 21 of FIG. 1 by causing the load signal LD to be a positive pulse.

For example, in FIG. 5, when it is predicted that a branch is performed by the branch instruction of the address &h114 included in the VLIW of the addresses &h10C to &h114, but the branch is not really performed, the post-prediction processing circuit 25 of FIG. 1 obtains an address &h134→&h130 next to the delay slot, and the address selection circuit 22 selects the obtained address as the address Aab and outputs the selected address as the address Ao. This address Ao=&h130 is loaded into the incrementer 21. Accordingly, the address Ao varies as &h130, &h140 . . . , in sequence.

When it is predicted by the BTB that the branch is not performed by the branch instruction of the address &h114 included in the VLIW of the addresses &h10C to &h114, but the branch is really performed, the address selection circuit 22 selects the address Ab=&h208→&h200 as the address Aab and outputs the selected address as the address Ao. This address Ao=&h200 is loaded into the incrementer 21. Accordingly, the address Ao varies as &h200, &h210 . . . , in sequence.

Second Embodiment

Now, a second embodiment of the present invention will be described in which information of the number of steps SN of branch slot instructions is not included in a branch instruction code.

Figure 6:
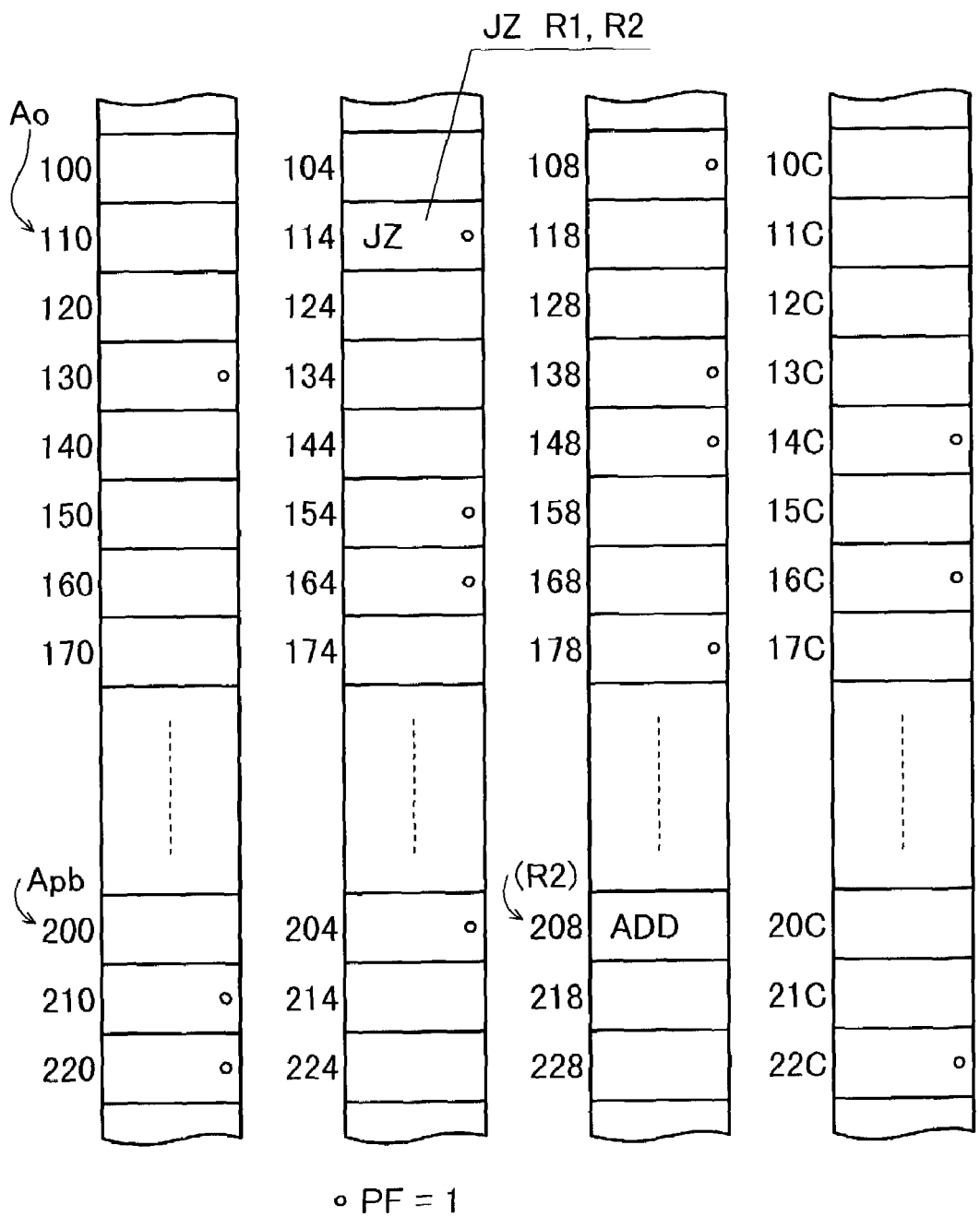
FIG. 6 is a schematic illustration of a part of a program according to a second embodiment of the present invention, while dividing the program into four slots in correspondence with the four-parallel instruction pipeline 10 of FIG. 1.

FIG. 6 is a schematic illustration partly showing a program according to the second embodiment while dividing the program into four slots in correspondence with the four-parallel instruction pipeline 10 of FIG. 1.

In FIG. 6, a branch instruction "JZ R1, R2" having a head address &h114 is different from the branch instruction of FIG. 5 only in that the number of steps SN is not included in the branch instruction of FIG. 6. Instead of using the number of steps SN, the packing flag PF is used to designate the final step of the delay slot instructions. In FIG. 6, delay slot instructions range from an instruction code subsequent to a VLIW of addresses &h10C to &h117 which includes the branch instruction to an instruction code in which the PF firstly becomes 1. Namely, the delay slot instructions range from address &h118 to address &h133.

Similarly to the first embodiment, the VLIW of the addresses &h10C to &h117 is recognized at a time when the contents of addresses &h110 to &h11F are read from the instruction cache. From this time, when the address Ao is incremented "2" times, instruction codes of addresses &h130 to &h13F in which there is a PF='1' are read from the instruction cache 11. The number "2" is converted to '010' by the post-prediction processing circuit 25 of FIG. 1, and then registered as the delay slot information POS in the BTB 241 of FIG. 3. Similarly to the correlation between the number of instruction steps SN and the delay slot information POS in the first embodiment, "2" designates the position of a bit '1' in the delay slot information POS.

When the prediction error signal ER is low, the operation of the control circuit 233 of FIG. 2 is the same as shown in the flow chart of FIG. 4. When the contents of the addresses &h130 to &h13F (corresponding to the "2" times) are read in step S5, it is determined by the instruction buffer & VLIW adjustment circuit 12 that the instruction code whose PF is '1' is the last step of the delay slot instructions.

The end of each VLIW among the delay slot instructions, other than the final step, is at an address whose lower bits is equal to "&hF". In the case of FIG. 6, the instruction buffer & VLIW adjustment circuit 12 recognizes each of the following three instruction blocks as a VLIW:

1) Instructions of addresses &118 to &h11F
2) Instructions of addresses &120 to &h12F
3) Instructions of addresses &130 to &h133

Other features are the same as the first embodiment.

According to the second embodiment, information of the number of steps SN of delay slot instructions is not included in the branch instruction, simplifying the instruction code, and thus the configuration of the instruction pipeline 10 is simpler than that of the first embodiment.

Although preferred embodiments of the present invention have been described, it is to be understood that the invention is not limited thereto and that various changes and modifications may be made without departing from the spirit and scope of the invention.

For example, although the embodiments have been described with reference to the case where the processor with the delayed branch function is a variable-length VLIW processor, since the present invention is characterized in that the delay slot information POS is stored in the BTB to use it, the present invention can be also applied to fixed-length VLIW processors or various kinds of non-VLIW processors having a delayed branch function.

In addition, the branch prediction circuit 23 may also be configured such that branch history information (corresponding to the valid flag V in above embodiments) in the BTB is composed of a plurality of bits, and the branch prediction is performed by recognizing the alternating pattern of the presence and absence of branches, or based on statistical results of the presence and absence of past branches.

What is claimed is:

1. An information processor having a delayed branch function, the processor comprising:
   an instruction cache; and
   an instruction read circuit configured to read Very Long Instruction Word (VLIW) instruction codes from the instruction cache by addressing the instruction cache, wherein the instruction read circuit comprises:
   a branch prediction circuit, including a storage in which a branch target address, branch history information, and delay slot information indicating a last position of delay slot instructions are stored in correspondence with an address of a branch instruction, outputting hit information as to whether or not an input address is coincident with the branch instruction address, when the coincidence is true, accessing the storage to output the delay slot information and prediction information on a presence of a branch based on the branch history information, obtaining a number of steps included in the VLIW instruction code based on the delay slot information, and when the prediction information indicates that there is a branch, further outputting the branch target address;
   an incrementer configured to output a sequential address; and
   an address selection circuit selectively outputting the branch target address or an output of the incrementer, based on the hit information, the delay slot information, and the prediction information, the address selection circuit outputting the output of the incrementer a predetermined number of times based on the delay slot information when the hit information indicates that the coincidence is true.

2. The information processor according to claim 1, wherein the address selection circuit comprises:
   a selector for selectively outputting the output of the incrementer or the branch target address to provide to the branch prediction circuit; and
   a selection control circuit for, in synchronism with a clock, causing the selector to select the output of the incrementer when the hit information indicates that the two addresses are not identical, causing the selector to select the output of the incrementer the predetermined number of times based on the delay slot information when the hit information indicates that the coincidence is true, and further, causing the selector to select the branch target address and causing the incrementer to load the branch target address when the prediction information indicates that there is a branch.

3. The information processor according to claim 1, further comprising a post-prediction processing circuit for, when the hit information indicates that the two addresses are not identical and an instruction of an address corresponding to the hit information is decoded to be a branch instruction, storing a branch target address of the branch instruction and the branch slot information in correspondence with the address of the branch instruction, and updating the corresponding branch history information of the branch target buffer on the basis of a result of judging a branch condition of the branch instruction.

4. The information processor according to claim 2, further comprising a post-prediction processing circuit for, when the hit information indicates that the two addresses are not identical and an instruction of an address corresponding to the hit information is decoded to be a branch instruction, storing a branch target address of the branch instruction and the branch slot information in correspondence with the address of the branch instruction, and updating the corresponding branch history information of the branch target buffer on the basis of a result of judging a branch condition of the branch instruction.

5. The information processor according to claim 3, wherein, when the hit information indicates that the coincidence is true, and the prediction information is different from the branch-condition judgment result, the post-prediction processing circuit makes an error signal active, and outputs an address to be executed next time on the basis of the branch-condition judgment result.

6. The information processor according to claim 4, wherein, when the hit information indicates that the coincidence is true, and the prediction information is different from the branch-condition judgment result, the post-prediction processing circuit makes an error signal active, and outputs an address to be executed next time on the basis of the branch-condition judgment result.

7. The information processor according to claim 5, wherein, when the error signal is inactive, the address selection circuit selectively outputs the output of the incrementer or the branch target address based on the hit information, the delay slot information, and the prediction information, and
   when the error signal is active, the address selection circuit outputs an address to be executed next time output from the post-prediction processing circuit.

8. The information processor according to claim 6, wherein, when the error signal is inactive, the address selection circuit selectively outputs the output of the incrementer or the branch target address based on the hit information, the delay slot information, and the prediction information, and
   when the error signal is active, the address selection circuit outputs an address to be executed next time output from the post-prediction processing circuit.

9. The information processor according to claim 3, further comprising a delay buffer for delaying the output of the selector, the hit information, and the branch history information to provide to the post-prediction processing circuit.

10. The information processor according to claim 4, further comprising a delay buffer for delaying the output of the selector, the hit information, and the branch history information to provide to the post-prediction processing circuit.

11. The information processor according to claim 5, further comprising a delay buffer for delaying the output of the selector, the hit information, and the branch history information to provide to the post-prediction processing circuit.

12. The information processor according to claim 6, further comprising a delay buffer for delaying the output of the selector, the hit information, and the branch history information to provide to the post-prediction processing circuit.

13. The information processor according to claim 7, further comprising a delay buffer for delaying the output of the selector, the hit information, and the branch history information to provide to the post-prediction processing circuit.

14. The information processor according to claim 8, further comprising a delay buffer for delaying the output of the selector, the hit information, and the branch history information to provide to the post-prediction processing circuit.

15. The information processor according to claim 1, further comprising:
   an instruction pipeline for receiving VLIWs; and
   an instruction buffer & VLIW adjustment circuit for determining a boundary between VLIWs based on a value of a packing flag in each of instruction codes included in a plurality of instructions read from the instruction cache, and adding a dummy information to a VLIW so that the VLIW's instruction length is maximized if the VLIW's instruction length is less than a maximum value, and then providing the VLIW to the instruction pipeline.

16. The information processor according to claim 2, further comprising:

an instruction pipeline for receiving VLIWs; and an instruction buffer & VLIW adjustment circuit for determining a boundary between VLIWs based on a value of a packing flag in each of instruction codes included in a plurality of instructions read from the instruction cache, and adding a dummy information to a VLIW so that the VLIW's instruction length is maximized if the VLIW's instruction length is less than a maximum value, and then providing the VLIW to the instruction pipeline.

17. The information processor according to claim 3, further comprising:

an instruction pipeline for receiving VLIWs; and an instruction buffer & VLIW adjustment circuit for determining a boundary between VLIWs based on a value of a packing flag in each of instruction codes included in a plurality of instructions read from the instruction cache, and adding a dummy information to a VLIW so that the VLIW's instruction length is maximized if the VLIW's instruction length is less than a maximum value, and then providing the VLIW to the instruction pipeline.

18. The information processor according to claim 4, further comprising:

an instruction pipeline for receiving VLIWs; and an instruction buffer & VLIW adjustment circuit for determining a boundary between VLIWs based on a value of a packing flag in each of instruction codes included in a plurality of instructions read from the instruction cache, and adding a dummy information to a VLIW so that the VLIW's instruction length is maximized if the VLIW's instruction length is less than a maximum value, and then providing the VLIW to the instruction pipeline.

19. The information processor according to claim 15, wherein a delayed branch instruction of a variable-length delay slot is included in an instruction set, and information of the number of instruction steps of the variable-length delay slot is included in the delayed branch instruction, and the instruction buffer & VLIW adjustment circuit determines instructions of the number of steps subsequent to the delayed branch instruction as a delay slot, and provides the instructions determined as the delay slot to the instruction pipeline irrespective of whether or not a branch condition of the branch instruction is satisfied.

20. The information processor according to claim 19, wherein the instruction buffer & VLIW adjustment circuit determines, as a delay slot, instruction codes in a range from an instruction code next to a branch instruction to an instruction code in which a packing flag firstly designates the boundary, and provides the VLIWs of the delay slot to the instruction pipeline irrespective of whether or not the branch condition of the branch instruction is satisfied.

21. The information processor according to claim 20, wherein the instruction buffer & VLIW adjustment circuit determines an end of instructions read from the instruction cache at once as a boundary of a VLIW included in the delay slot.

22. The information processor according to claim 1, wherein the delay slot information is one associated with a step number of the delay slot instructions.

* * * * *